(12) United States Patent
Yang

(10) Patent No.: US 7,695,664 B2
(45) Date of Patent: Apr. 13, 2010

(54) PRODUCTION METHOD FOR MOLDING PLASTICS ON SOFT CLOTH

(75) Inventor: Shih-Sheng Yang, Taipei Hsien (TW)

(73) Assignee: Universal Trim Supply Co., Ltd., Taipei Hsien (TW)

( * ) Notice: Subject to any disclaimer, the term of this patent is extended or adjusted under 35 U.S.C. 154(b) by 41 days.

(21) Appl. No.: 11/905,151

(22) Filed: Sep. 27, 2007

(65) Prior Publication Data

US 2008/0197529 A1 Aug. 21, 2008

(30) Foreign Application Priority Data

Sep. 30, 2006 (CN) .................. 2006 1 0131875

(51) Int. Cl.
  *B29C 45/14* (2006.01)
  *B29C 45/16* (2006.01)
  *A42C 1/00* (2006.01)
  *D06C 25/00* (2006.01)
(52) U.S. Cl. .................. 264/279; 264/153; 264/258; 264/324
(58) Field of Classification Search .................. 264/153, 264/247, 254, 258, 279, 324
  See application file for complete search history.

(56) References Cited

U.S. PATENT DOCUMENTS

| | | | | |
|---|---|---|---|---|
| 2,821,764 A * | 2/1958 | Leahy et al. ................ 24/713.6 |
| 2,922,417 A * | 1/1960 | Goettelman et al. .... 128/206.12 |
| 3,594,262 A * | 7/1971 | Magidson ..................... 442/38 |
| 4,134,955 A * | 1/1979 | Hanrahan et al. ........... 264/244 |
| 4,466,138 A * | 8/1984 | Gessalin ........................ 2/410 |
| 4,793,881 A * | 12/1988 | Fink ........................... 156/212 |
| 4,973,376 A * | 11/1990 | Chiu ........................... 156/254 |
| 5,053,179 A * | 10/1991 | Masui et al. ................ 264/257 |
| 5,389,176 A * | 2/1995 | Nakanishi et al. ........... 156/242 |
| 5,623,133 A * | 4/1997 | Kurihara ..................... 181/175 |
| 5,857,215 A * | 1/1999 | Fergason et al. ................ 2/8.3 |
| 6,065,197 A * | 5/2000 | Iseki et al. .................... 29/91.1 |
| 6,540,950 B1 * | 4/2003 | Coffield ...................... 264/257 |
| 2001/0000736 A1* | 5/2001 | Piec et al. ...................... 428/31 |
| 2001/0038232 A1* | 11/2001 | Yera ............................ 296/214 |
| 2002/0171169 A1* | 11/2002 | Chuang ....................... 264/247 |
| 2004/0018337 A1* | 1/2004 | Hus et al. ...................... 428/91 |
| 2004/0112895 A1* | 6/2004 | Bartasevich et al. ....... 220/4.28 |

FOREIGN PATENT DOCUMENTS

CN 1110730 * 10/1995

* cited by examiner

*Primary Examiner*—Matthew J. Daniels
(74) *Attorney, Agent, or Firm*—Leong C. Lei

(57) ABSTRACT

A production method for molding includes a. a first molding: depending on a shape to be molded, implementing a die feed-in on soft cloth, with the plastic that is injected in being fused and set with the cloth, for serving as a substrate layer; b. punching and trimming: punching and trimming the plastic that has been set to form a base; c. a second molding: implementing a second die feed-in on the base of a shaped product, with the injected-in plastic being fused and set with a surface of the base, to form the needed shape; d. tailoring and trimming: tailoring and trimming an edge interface between two layers of the assembled plastic to form a shaped product of a double-layer plastic on the soft cloth.

1 Claim, 7 Drawing Sheets

PRODUCTION METHOD FOR MOLDING PLASTICS ON SOFT CLOTH

BACKGROUND OF THE INVENTION (a) Field of the Invention

The present invention relates to a production method for molding plastics on soft cloth, and more particularly to a production method which molds plastics on soft cloth, such that the plastics can be stably molded on the soft cloth in an unstable shape.

(b) Description of the Prior Art

Currently, as continuous promotion to commercial trademarks by companies, many vendors have developed new trademark ornaments for advertisement, and three-dimensional graphical ornaments of trademarks made by plastics on soft fabrics have started to show up. When the graphical ornaments fit with the soft fabrics to manifest the trademarks to general public, a soft sense of touch can be prominent, and is getting more and more appreciated by the public.

In molding, how to fit with softness of the soft fabrics, and at a same time, to provide a great stability to the molded plastics is required in a market. At present, a primary way by related industries for assembling the plastics with the fabrics is to use an ultrasonic finishing method to melt and assemble the plastics on the fabrics. As the fabrics are very soft, and their shapes are unstable, the molded plastics on the soft fabrics will be certainly in lack of the sufficient stability. Therefore, if the molded objects can be provided with a good stability, then an improvement and development of this molded plastic product on the cloth can be surely promoted.

SUMMARY OF THE INVENTION

The primary object of the present invention is to provide a production method for molding plastics on soft cloth in an unstable shape, so as to increase a stability of the plastics that are molded on the soft cloth.

Accordingly, the production method provided by the present invention includes following steps:
  a. A first molding: Depending on a shape to be molded, a die feed-in is implemented on soft cloth, and after hot melting, a plastic that is injected in is fused and set with the cloth to form the needed shape, for serving as a substrate layer for the molded plastic on the soft cloth;
  b. Punching and trimming: The plastic pattern that has been set is punched and trimmed, to form a base of a shaped product;
  c. A second molding: A die feed-in is implemented again on the shaped product after accomplishing the step b, with the plastic being injected into from the base of the shaped product; after hot melting, the plastic that is injected in is fused and set with a surface of the base to form the needed shape; and
  d. Tailoring and trimming: An interface between two layers of the assembled plastic is tailored and trimmed, so as to form a shaped product of the double-layer plastic on the soft cloth.

The aforementioned cloth, the plastic that is injected in at the first molding, and the plastic that is injected in at the second molding, are the cloth and plastics with a similar molecular structure.

For the first molding in the aforementioned step a, a mold cavity of a mold block is installed according to the shape of the plastic to be molded, and then the plastic is injected on the soft cloth which has been clamped and fixed in the mold block, through feed-in holes at a back of the mold block, so as to mold into the required plastic pattern on the soft cloth.

An edge of the substrate layer for the first molding in the aforementioned step a is molded into a groove facilitating an alignment of a punching die-cut.

A shape of the substrate layer in the aforementioned step a is larger than or equal to that of the base of the shaped product.

For the first molding in the aforementioned step a, a pin-point feed-in method which can stabilize the material is used for the die feed-in, and there is at least one feed-in point.

For the second molding in the aforementioned step c, a pin-point feed-in method which can stabilize the material is used for the die feed-in, and there is at least one feed-in point.

For the second molding in the aforementioned step c, the feed-in holes are located at the edge interface between the first plastic layer and the second plastic layer, to carry out the feed-in.

The production method of the present invention is simple, and the double-layer of plastic molding is implemented on the soft cloth during the finishing process, such that the first plastic layer can be used as the substrate layer, thereby providing the great stability and enabling the produced object to have a soft texture and the stability in assembling. Therefore, an added value of the product can be increased, and the product can be even more appreciated by general public.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
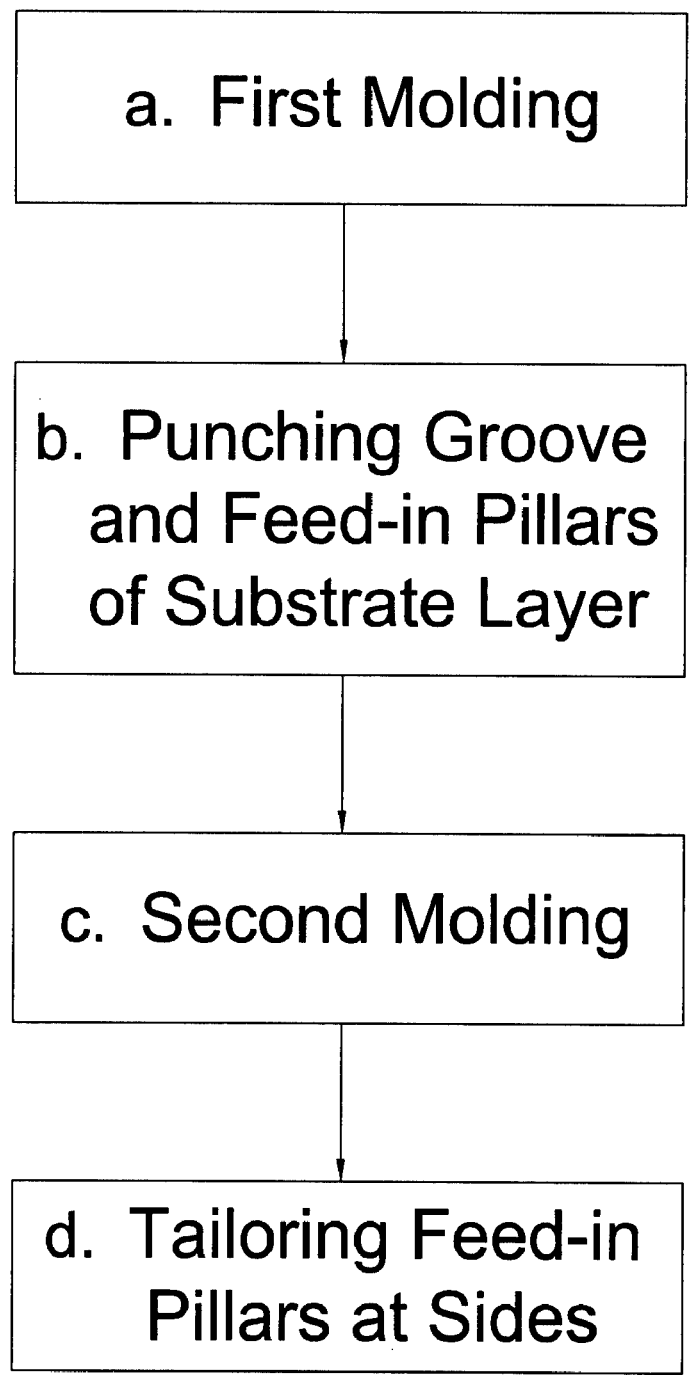
FIG. 1 shows a flow diagram of manufacturing steps of the present invention.
Figure 2:
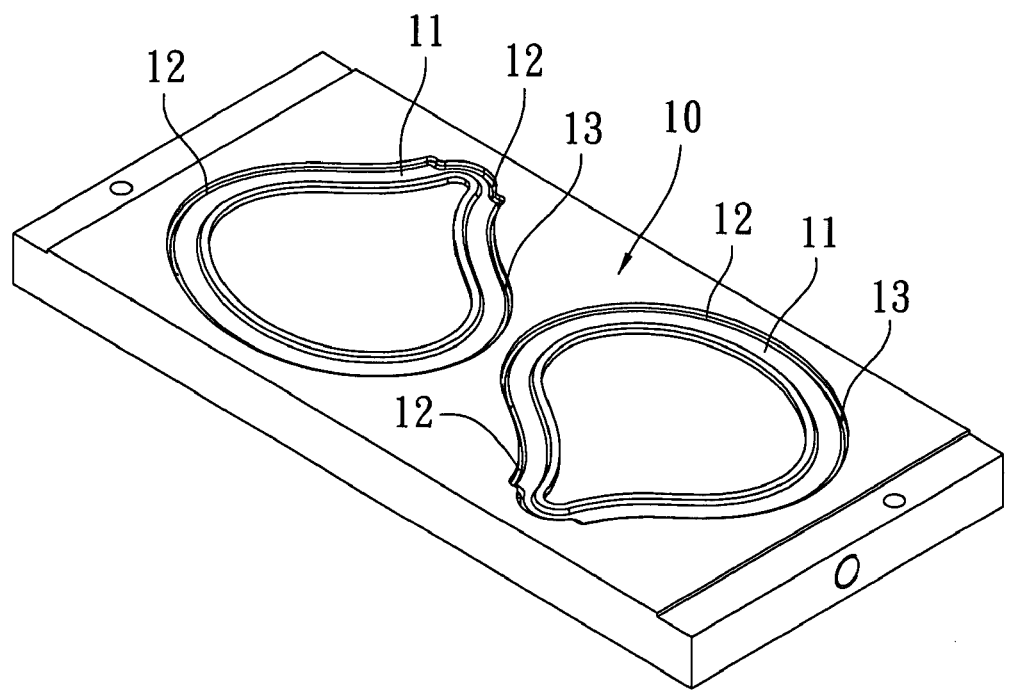
FIG. 2 shows a schematic view of a mold cavity at a front face of a mold block in a first molding of an embodiment of the present invention.
Figure 3:
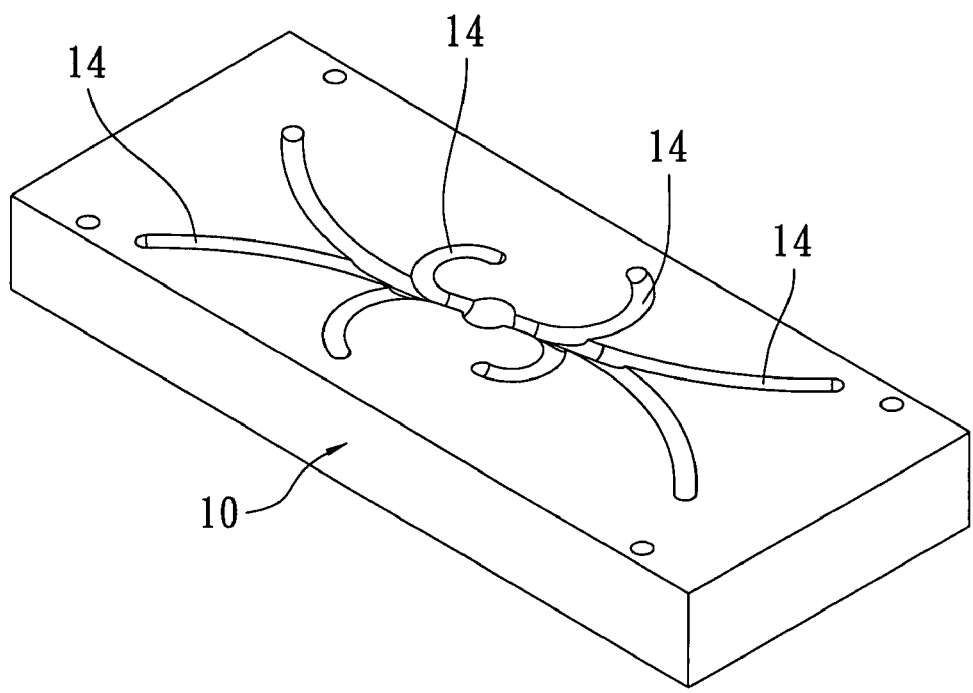
FIG. 3 shows a schematic view of ducts and feed-in holes between the ducts at a back of a mold block in a first molding of an embodiment of the present invention.
Figure 4:
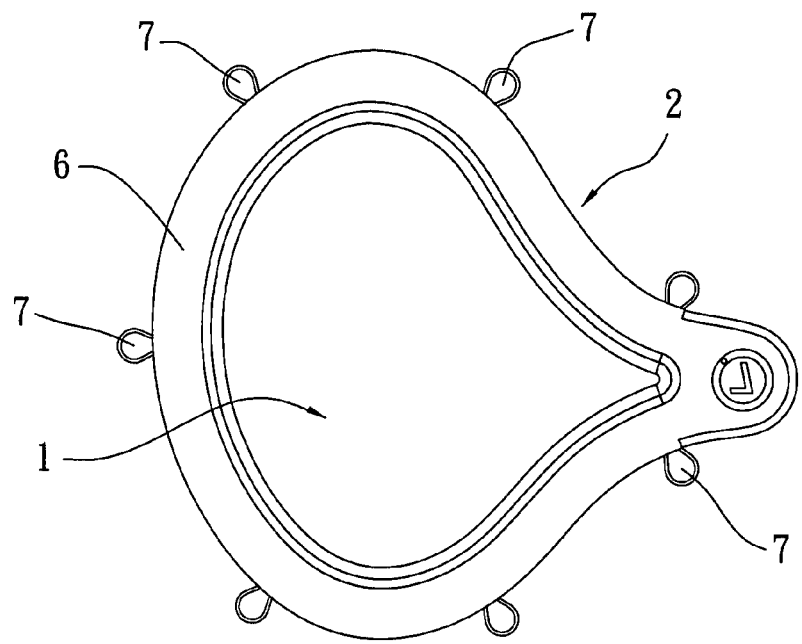
FIG. 4 shows a rear view of a frame of a second plastic layer of an embodiment of the present invention.
Figure 5:
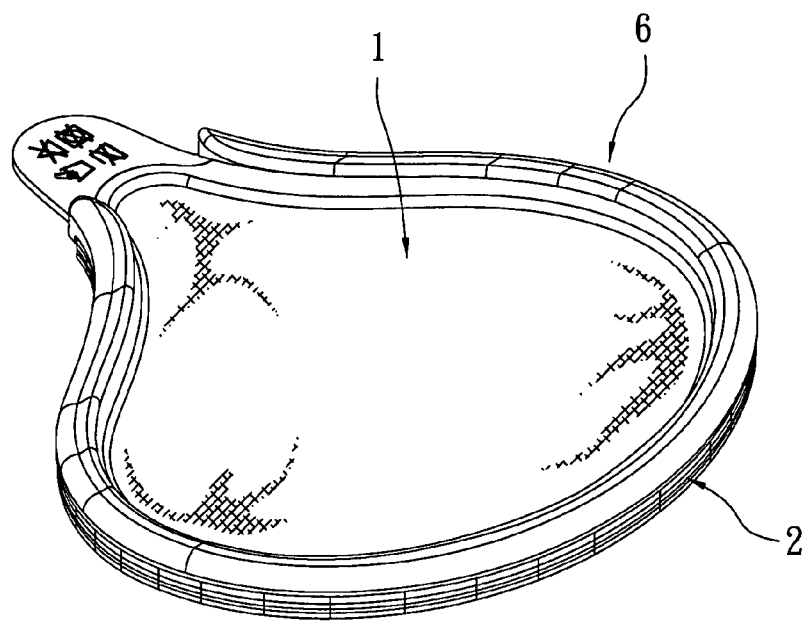
FIG. 5 shows a schematic view of a shaped product formed by tailoring feed-in pillars of a second feed-in, after carrying out a second molding, of an embodiment of the present invention.
Figure 6:
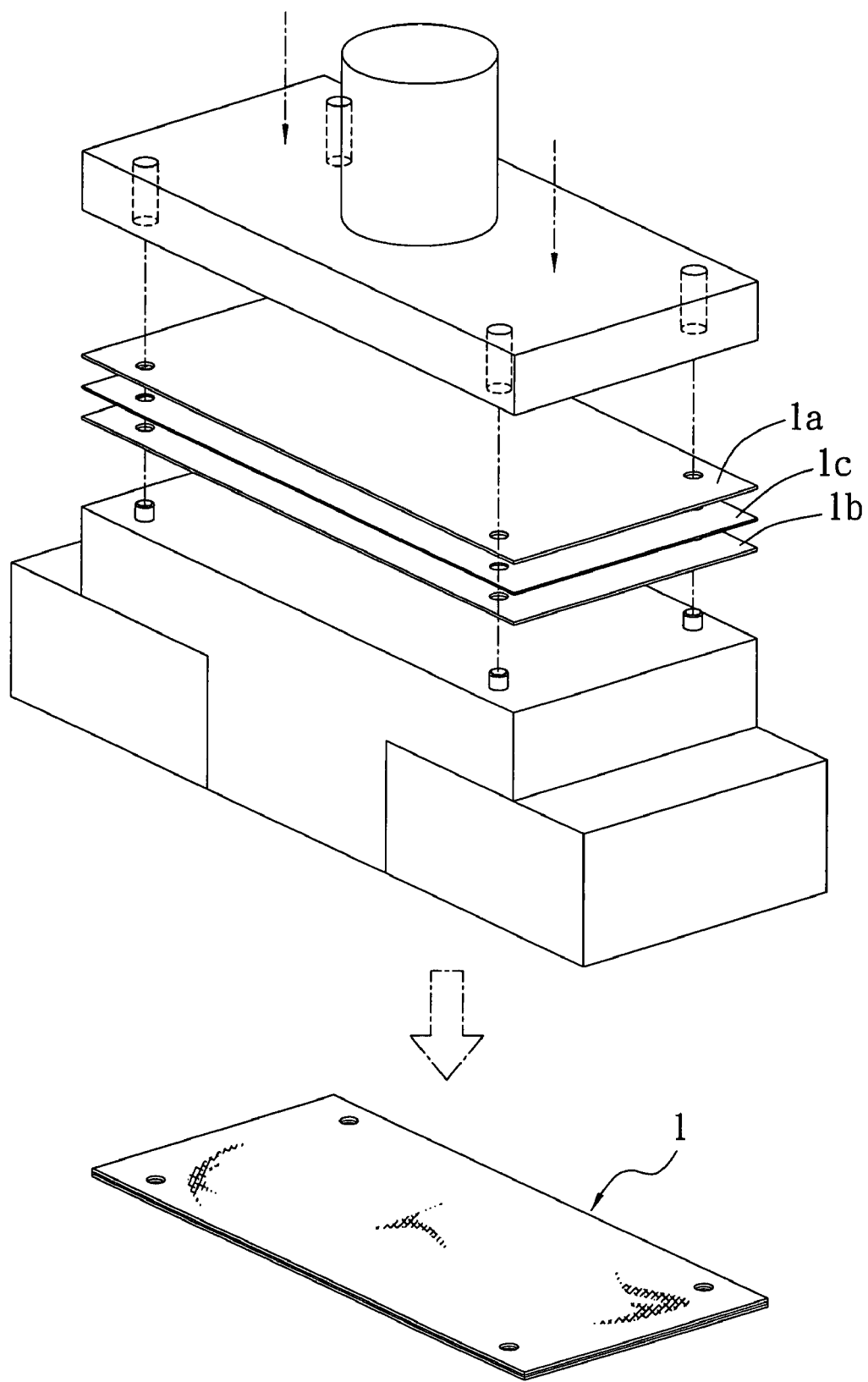
FIG. 6 shows a schematic view of an operation for pressing a double-layer of cloth of an embodiment of the present invention.
Figure 7:
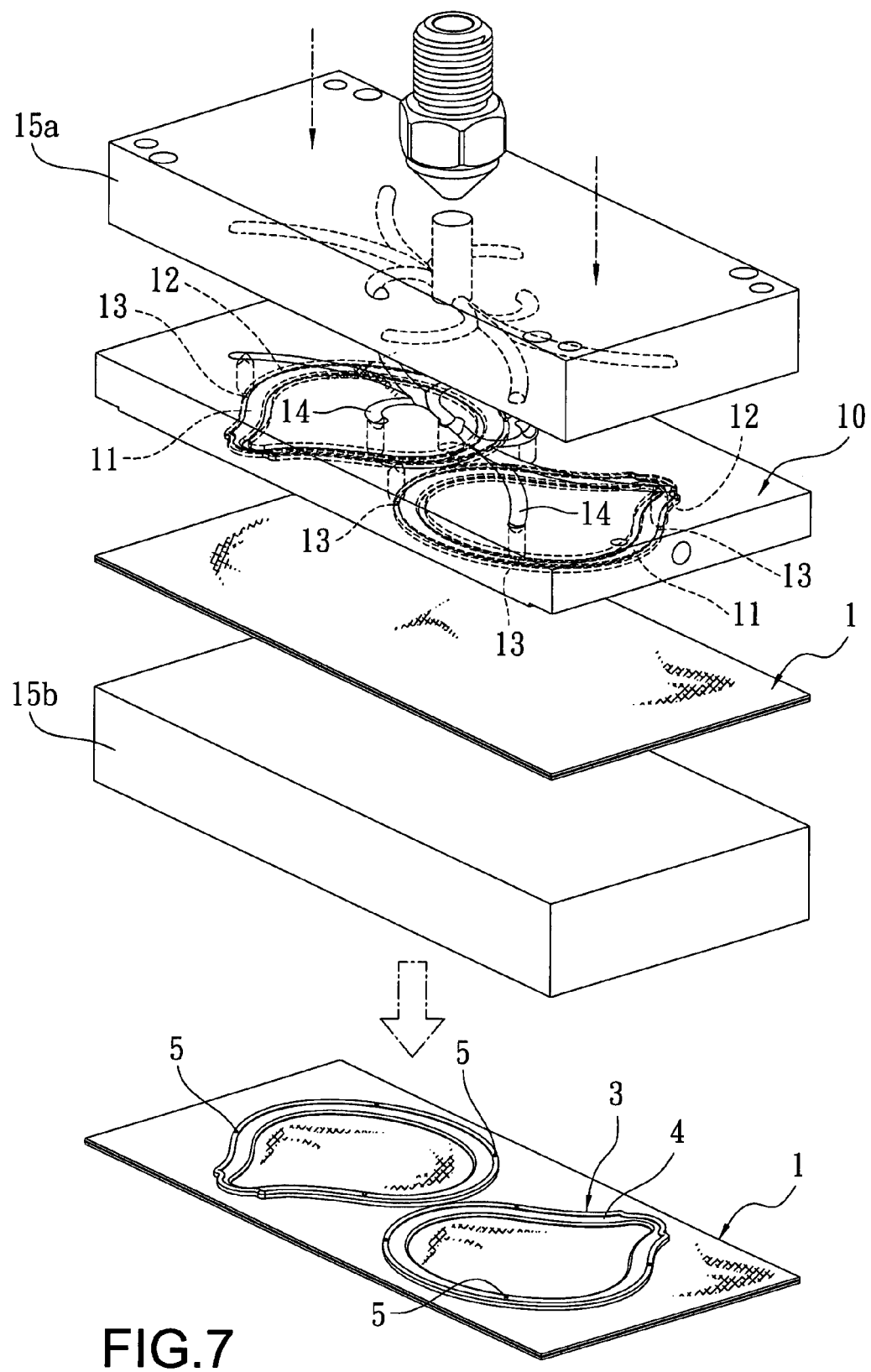
FIG. 7 shows a schematic view of an operation for carrying out a first molding to form a substrate layer on cotton cloth, of an embodiment of the present invention.
Figure 8:
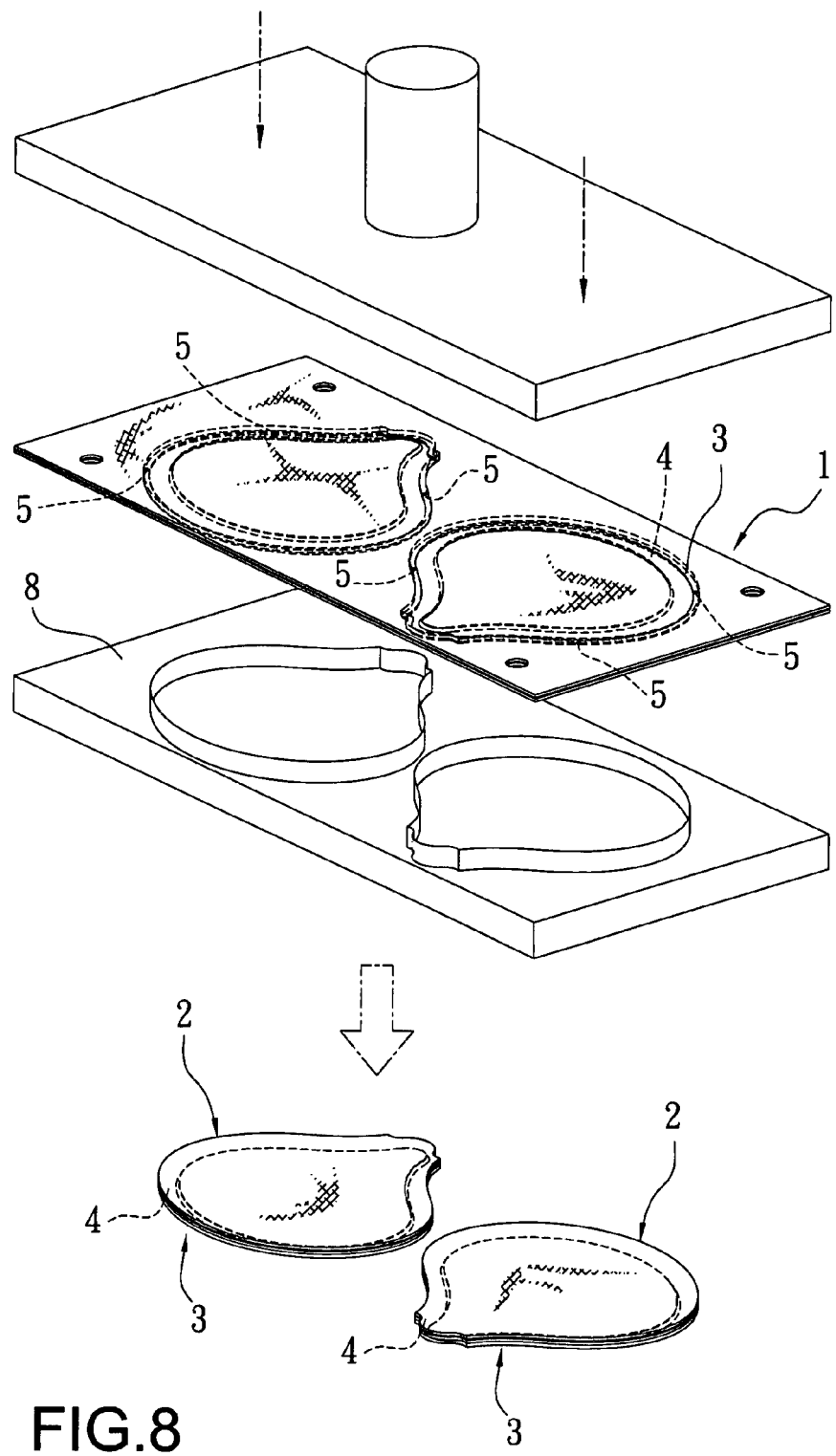
FIG. 8 shows a schematic view an operation for punching and trimming a plastic pattern that has been set, to form a shaped product, of an embodiment of the present invention.
Figure 9:
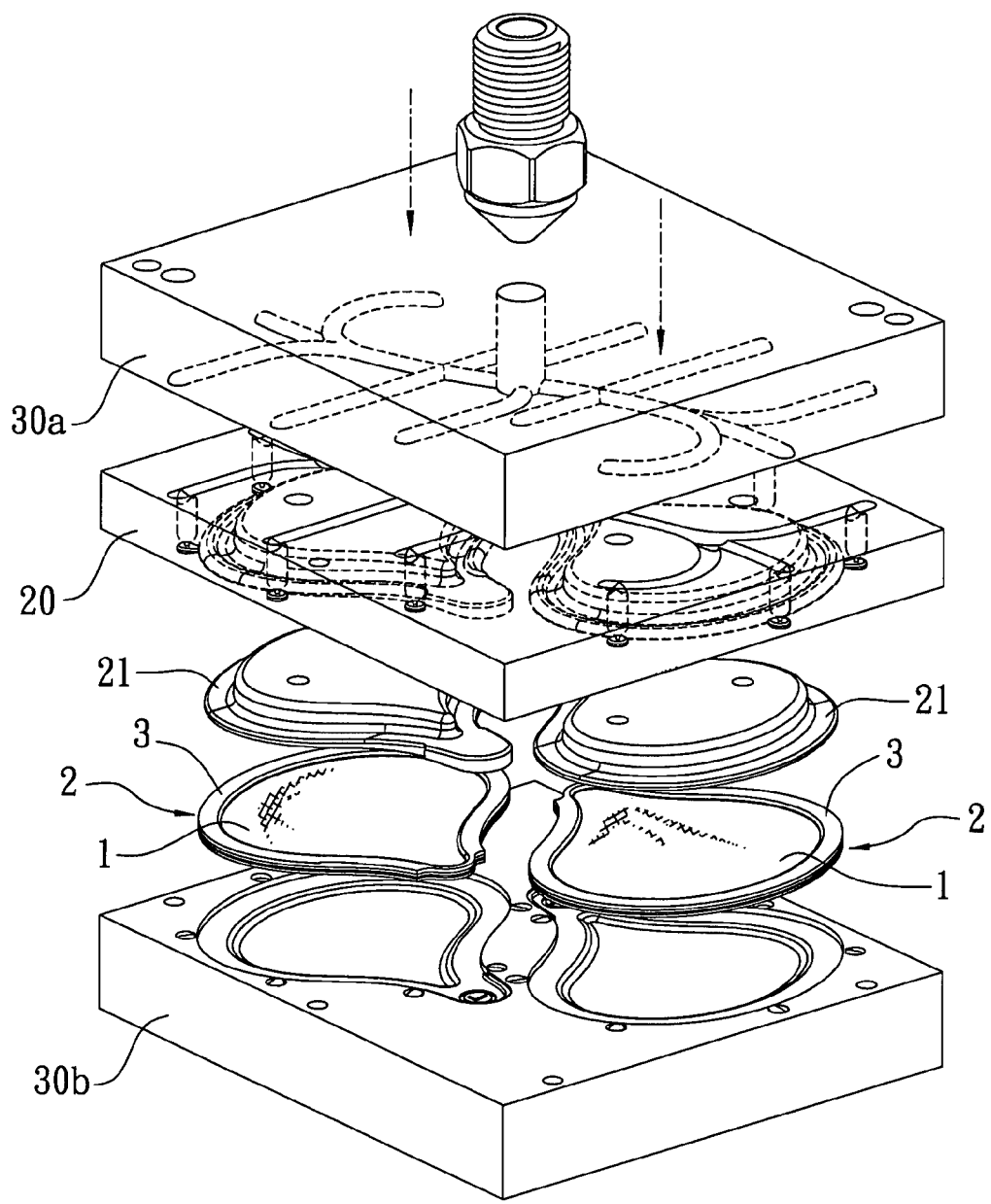
FIG. 9 shows a schematic view of an operation for carrying out a second feed-in on a base of a shaped object that has been punched, with the plastic that has been injected in being fused and set with a surface of the base after hot melting, of an embodiment of the present invention.

A specific embodiment of the present invention is to make an ear muff on a piece of double-layer soft cloth, and to mold into a plastic frame on its edge. Related manufacturing steps, including a. a first molding, b. punching a groove and feed-in pillars of a substrate layer, c. a second molding, and d. tailoring feed-in pillars at a side, are shown in FIG. 1. As shown in each drawing, steps for manufacturing a pair of ear muffs comprise:

1. Pressing a piece of double-layer cotton cloth: Two layers of rectangular cloth, with one layer being a piece of down cloth 1a (as shown in FIG. 6), and the other layer being a piece of nylon cloth 1b, are smoothly overlapped, and paved in between with a layer of glue film 1c, followed by pressing and pasting the double-layer cloth at a periphery of an ear muff 2 shape (as shown in FIG. 5) into a piece of cotton cloth 1, using high temperature of a hot-press machine, according to the shape of the ear muff 2 to be molded;
2. Making a die plate: According to the shape of the ear muff 2 (as shown in FIG. 5) to be made, a finishing surface of a mold block 10 is carved into an indent 11 of the ear muff 2, as shown in FIG. 2, with a periphery of the indent 11 being molded into a mold cavity 12 having a substrate layer and a groove of a plastic frame (as shown in FIG. 2);
3. Setting up positions for arranging feed-in holes and carrying out the feed-in: The mold cavity 12 at the periphery of each ear muff shape on the mold block 10 is disposed with a plurality of feed-in holes 13 (as shown in FIG. 2), each feed-in position of the feed-in hole 13 is exactly facing to an edge groove in the mold block 10, and ducts 14 are located between each feed-in hole 13 at a back of the mold block 10 to connect the feed-in holes 13 (as shown in FIG. 3), followed by clamping and fixing the cotton cloth 1 that has been pressed in advance in step 1 on a front face of the mold block 10 in step 2, with another plate-type molding tool (as shown in FIG. 7); as shown in FIG. 3 and FIG. 7, through the ducts 14 on the back of the mold block 10 and the feed-in holes 13 in the ducts 14, the plastic is injected in with a pin-point feed-in method using three die plates to stably clamp and press the plastic; the three die plates are an upper mold block 15a, a lower mold block 15b, and the mold block 10, and there is at least one feed-in point, allowing the plastic to be fed in uniformly; a plastic having a similar molecular structure to the cloth is selected as the plastic to be injected in, and the plastic is fused and set with the cloth after hot melting, such that a plastic frame 3 can be molded on the periphery of an ear muff shape to serve as a substrate layer and to be provided with a groove structure 4 (as shown in FIG. 7), with a shape of the substrate layer being larger than or equal to that of a base of a shaped product, for facilitating a punching in a later step;
4. Punching off the groove and the feed-in pillars: As the feed-in positions of the feed-in holes 13 on the mold block 10 are all exactly facing the edge groove in the mold block 10, an outer rim of the groove 4 will be formed with excessive feed-in pillars 5 (as shown in FIG. 8) after the die feed-in step, and a punching die-cut 8 will be aligned with the outer rim of the groove 4 to cut off a part of the groove and the feed-in pillars 5 on an edge of the substrate layer of the molded ear muff 2, thereby forming two shaped products of the ear muff 2, and molding into a base of the plastic frame at an edge of the ear muff;
5. A second feed-in molding: A mold block 20 (as shown in FIG. 9) and a movable mold block 21 are made to mold into a plastic frame, and a second die feed-in is implemented again on a molded semi-product of the ear muff 2 having a base of the plastic frame 3; the molded plastic frame 3 in the aforementioned step 4 is used as a semi-product of the ear muff 2, is clamped and fixed on the aforementioned mold block 20 that can mold into the plastic frame with other plate-type molding tools 30a, 30b, and is interlined with the movable mold block 21, whereas the feed-in is implemented from the feed-in hole positions at an edge of the frame 3 of the first plastic layer, also using the pin-point feed-in method of three die plates for stably clamping and pressing the plastic, and with at least one feed-in point, allowing the feed-in to be uniformly carried out; a plastic having a similar molecular structure to the cloth is chosen, and the plastic that is injected in is fused with a surface of the base through hot melting, so as to be set into a frame 6 of the second plastic layer (as shown in FIG. 4) in a required shape; whereas in carrying out the second die feed-in, positions of the second feed-in 7 are located at an edge interface between the two plastic layers (as shown in FIG. 4);
6. Tailoring the feed-in holes of the second feed-in: As shown in FIG. 5, the feed-in pillars (i.e., the feed-in positions 7) of the second feed-in, at the edge interfaces between the two plastic layers are tailored off, and then the frame 6 of the second plastic layer is molded on the base by assembling with the edge of the ear muff made by soft cloth 1, finally forming the shaped product of the ear muff 2, as shown in FIG. 5.

The aforementioned is only a preferred embodiment of the present invention which can be also applied on the soft fabrics to mold into graphical ornaments of trademarks. The graphical ornaments can fit with the soft fabrics to manifest a three-dimensional visual effect of the trademarks to general public, and to provide a soft sense of touch.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A production method for molding plastics on soft cloth comprising steps of:
   a. laminating a piece of down cloth and a piece of nylon cloth together using a hot-press into a double layer cloth;
   b. a first molding: a die feed-in being implemented on the double-layer cloth to inject plastic on said double layer cloth to form a predetermined shape, for serving as a substrate layer for the molded plastic on the double layer cloth, the first molding being to install a mold cavity of a mold block and then to inject the plastic on the double layer cloth that has been clamped and fixed in the mold block, through feed-in holes at a back of the mold block, thereby molding into required plastic pattern on the double layer cloth, an edge of the substrate layer that is formed in the first molding being molded into a groove facilitating an alignment of a punching die-cut;
   c. punching and trimming: the plastic pattern that has been set being punched and trimmed, for forming a base of a shaped product;
   d. a second molding: a die feed-in being implemented again on the shaped product after step c, with plastic being injected in from the base of the shaped product; after hot melting, the plastic that is injected in being fused and set with a surface of a base to form a determined shape; and feed-in holes being provided at an edge interface between a first plastic layer and a second plastic layer for carrying out the feed-in; and
   e. tailoring and trimming: an interface between two layers of the assembled plastic being tailored and trimmed, to form a shaped product of the double-layer plastic on the double layer cloth.

* * * * *